US008442730B2

(12) United States Patent
Okamura et al.

(10) Patent No.: US 8,442,730 B2
(45) Date of Patent: May 14, 2013

(54) CONSTRUCTION EQUIPMENT, METHOD OF CONTROLLING CONSTRUCTION EQUIPMENT, AND PROGRAM FOR CAUSING COMPUTER TO EXECUTE THE METHOD

(75) Inventors: Kenji Okamura, Hiratsuka (JP); Masashi Ichihara, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/254,935

(22) PCT Filed: Mar. 5, 2010

(86) PCT No.: PCT/JP2010/053607

§ 371 (c)(1), (2), (4) Date: Sep. 6, 2011

(87) PCT Pub. No.: WO2010/101235

PCT Pub. Date: Sep. 10, 2010

(65) Prior Publication Data

US 2012/0004816 A1 Jan. 5, 2012

(30) Foreign Application Priority Data

Mar. 6, 2009 (JP) ................................ 2009-053943

(51) Int. Cl.
*G06F 7/70* (2006.01)

(52) U.S. Cl.
USPC ........................................................ 701/50

(58) Field of Classification Search .................... 701/36, 701/50

See application file for complete search history.

(56) References Cited

U.S. PATENT DOCUMENTS

2005/0177292 A1 8/2005 Okamura et al.
2009/0299562 A1* 12/2009 Sudou et al. .................... 701/25

FOREIGN PATENT DOCUMENTS

JP H07-54806 A 2/1995
JP H09-328785 A 12/1997
JP H10-88623 A 4/1998
JP 2005-256595 A 9/2005

OTHER PUBLICATIONS

International Search Report from International Application No. PCT/JP2010/053607, mailed Jun. 8, 2010, 2 pages.

* cited by examiner

*Primary Examiner* — Kim T Nguyen
(74) *Attorney, Agent, or Firm* — Fish & Richardson P.C.

(57) ABSTRACT

A controller of a construction machine includes a target command value computing unit generating a speed target command value for normal motion of a working equipment based on a manipulating signal, a target command value correcting unit correcting the command value, and a command signal output unit outputting a command signal to a driving device based on the corrected speed target command value. The target command value correcting unit includes a vibration suppressing unit generating a speed target command value for vibration suppression to suppress generation of vibrations in the working equipment based on the command value, a peak value recognizing unit recognizing a peak value of the command value based on the command value sequentially generated by the target command value computing unit, and a target command value compositing unit compositing the command values according to the peak value to correct the command value.

2 Claims, 12 Drawing Sheets

CONSTRUCTION EQUIPMENT, METHOD OF CONTROLLING CONSTRUCTION EQUIPMENT, AND PROGRAM FOR CAUSING COMPUTER TO EXECUTE THE METHOD

CROSS REFERENCE TO RELATED APPLICATIONS

This application claims priority to Application No. PCT/JP2010/053607 filed on Mar. 5, 2010, which application claims priority to Japanese Application No. 2009-053943, filed on Mar. 6, 2009. The entire contents of the above applications are incorporated herein by reference in their entireties.

TECHNICAL FIELD

The present invention relates to a construction machine, a method for controlling the construction machine, and a program for causing a computer to execute the method.

BACKGROUND ART

A construction machine such as a hydraulic excavator carries out various types of works by operating a working equipment including an arm and a boom. In such a construction machine, because the working equipment has a large inertia when being suddenly started or stopped, the reaction of the operation of the working equipment causes vibrations in the working equipment and the construction machine.

Accordingly, for suddenly starting or stopping the working equipment, there has been proposed a typical technique including a function to suppress the vibrations in the working equipment and the construction machine (hereinafter referred to as a “vibration suppressing function”) by correcting a speed target command value of the working equipment corresponding to an operation of a lever to move the working equipment slowly (see, for instance, Patent Literature 1).

In the technique of Patent Literature 1, for instance, while vibration conditions to be generated in the working equipment and the construction machine in response to the motion of the working equipment by operating the lever are expectably set as vibration models, the speed target command value of the working equipment corresponding to the operation of the lever is corrected by computing of inverse characteristics for cancelling the expected vibrations.

CITATION LIST

Patent Literature

Patent Literature 1 JP-A-2005-256595

SUMMARY OF THE INVENTION

Problem to be Solved by the Invention

In the technique of Patent Literature 1, as a result of providing the vibration suppressing function, when the working equipment is suddenly started or stopped, even after the operation of the lever is stopped, the motion of the working equipment does not stop but continues for a predetermined period of time (so-called an unintended motion).

The occurrence of such an unintended motion makes it difficult to finely position the working equipment for, e.g., an inching operation, and thus lowers operability.

An object of the invention is to provide a construction machine capable of improving operability of a working equipment while suppressing vibrations in the working equipment, a method for controlling the construction machine, and a program that allows a computer to execute the method.

Means for Solving the Problems

According to a first aspect of the invention, a construction machine includes:

a working equipment;

an operating unit that is used to operate the working equipment; and a controller that controls the working equipment based on a manipulating signal inputted through the operating unit, the controller including:

a target command value computing unit that generates a speed target command value for normal motion of the working equipment based on the manipulating signal;

a target command value correcting unit that corrects the speed target command value for normal motion; and a command signal output unit that outputs a command signal to a driving device that drives the working equipment based on the corrected speed target command value, the target command value correcting unit including:

a vibration suppressing unit that generates a speed target command value for vibration suppression to suppress generation of vibrations in the working equipment based on the speed target command value for normal motion;

a peak value recognizing unit that recognizes a peak value of the speed target command value for normal motion based on the speed target command value for normal motion sequentially generated by the target command value computing unit; and a target command value compositing unit that composites the speed target command value for normal motion and the speed target command value for vibration suppression in accordance with the peak value to correct the speed target command value for normal motion.

The concept of the target command value computing unit herein is as follows: the target command value computing unit is not necessarily required to convert a manipulating signal by way of amplification, modulation or the like, but may be substantially unfunctional such that a manipulating signal is directly provided as a speed target command value for normal motion almost without being converted.

A second aspect of the invention is derived from the first aspect of the invention to provide a method. Specifically, according to the second aspect of the invention, a method for controlling a construction machine, the construction machine including:

a working equipment;

an operating unit that is used to operate the working equipment; and a controller that controls the working equipment based on a manipulating signal inputted through the operating unit, the method includes:

generating a first target command value as a speed target command value for normal motion of the working equipment based on the manipulating signal inputted through the operating unit used to operate the working equipment;

generating a second target command value as a speed target command value for vibration suppression to suppress generation of vibrations in the working equipment based on the speed target command value for normal motion;

recognizing a peak value of the speed target command value for normal motion based on the speed target command value for normal motion sequentially generated in the generating of the first target command value; and compositing the speed target command value for normal motion and the speed target command value for vibration suppression in accordance with the peak value to correct the speed target command value for normal motion, the generating of the speed target command value for normal motion, the generating of the speed target command value for vibration suppression, the recognizing of the peak value and the compositing of the speed target command value for normal motion and the speed target command value for vibration suppression being carried out by the controller.

A third aspect of the invention is directed to a computer-executable program that allows a controller in a construction machine to carry out the second aspect of the invention.

According to the first aspect of the invention, the speed target command value for normal motion and the speed target command value for vibration suppression are sequentially generated based on the manipulating signal and a peak value at which the speed target command value for normal motion turns downward (deceleration) is recognized based on the speed target command value for normal motion. Based on the peak value, a composition ratio of the speed target command value for normal motion and a composition ratio of the speed target command value for vibration suppression are determined. The speed target command value for normal motion and the speed target command value for vibration suppression are composited in accordance with their respective composition ratios.

For instance, when the peak value is smaller, i.e., the inclination angle of the lever at the time for the speed target command value for normal motion to turn downward (deceleration) is closer to zero (neutral position), the composition ratio of the speed target command value for normal motion is set higher while the second target command value for vibration suppression is set lower. On the other hand, when the peak value is larger, i.e., when the inclination angle of the lever at the time for the speed target command value for normal motion to turn downward (deceleration) is closer to a maximum inclination angle within a structurally possible range, the composition ratio of the speed target command value of the normal motion is set lower while the composition ratio of the speed target command value for vibration suppression is set higher in the manner contrary to the above. By determining the respective composition ratios based on the peak value as described above, it is possible to operate the working equipment as follows.

In an inching operation or the like, since the inclination angle of the lever at the time for the speed target command value for normal motion to turn downward (deceleration) is close to zero (neutral position), the peak value is small. As a result, with the high composition ratio of the speed target command value for normal motion and the low composition ratio of the speed target command value for vibration suppression, the speed target command values are composited (i.e., the speed target command value for normal motion is corrected). By operating the working equipment based on the corrected speed target command value, because the vibration suppression function is less effective (the composition ratio of the speed target command value for vibration suppression is low), it is possible to promptly operate the working equipment while suppressing an unintended motion of the working equipment. In other words, in performing the inching operation, an unintended motion of the working equipment is suppressed, so that it is possible to finely position the working equipment without any difficulty.

In contrast, in any other lever operation, since the inclination angle of the lever at the time for the speed target command value for normal motion to turn downward (deceleration) is close to the maximum inclination angle, the peak value is large. As a result, with the low composition ratio of the speed target command value for normal motion and the high composition ratio of the speed target command value for vibration suppression, the speed target command values are composited. By operating the working equipment based on the corrected speed target command value, because the vibration suppression function is fairly effective (the composition ratio of the speed target command value for vibration suppression is high), it is possible to sufficiently suppress vibrations in the working equipment or the construction machine even when the working equipment is suddenly started or stopped.

As described above, by enhancing or weakening the vibration suppression function in accordance with the state of the lever operation (the magnitude of the peak value), it is possible to improve the operability of the working equipment while suppressing vibrations in the working equipment.

According to the second aspect of the invention, the same effects and advantages as those in the first aspect of the invention can be obtained.

According to the third aspect of the invention, the method according to the second aspect of the invention can be carried out as long as a program is installed on a controller of a general construction machine, so that the invention can be significantly popularized.

DESCRIPTION OF EXEMPLARY EMBODIMENTS

An exemplary embodiment of the invention will be described below with reference to the drawings.

(1) Overall Structure

Figure 1:
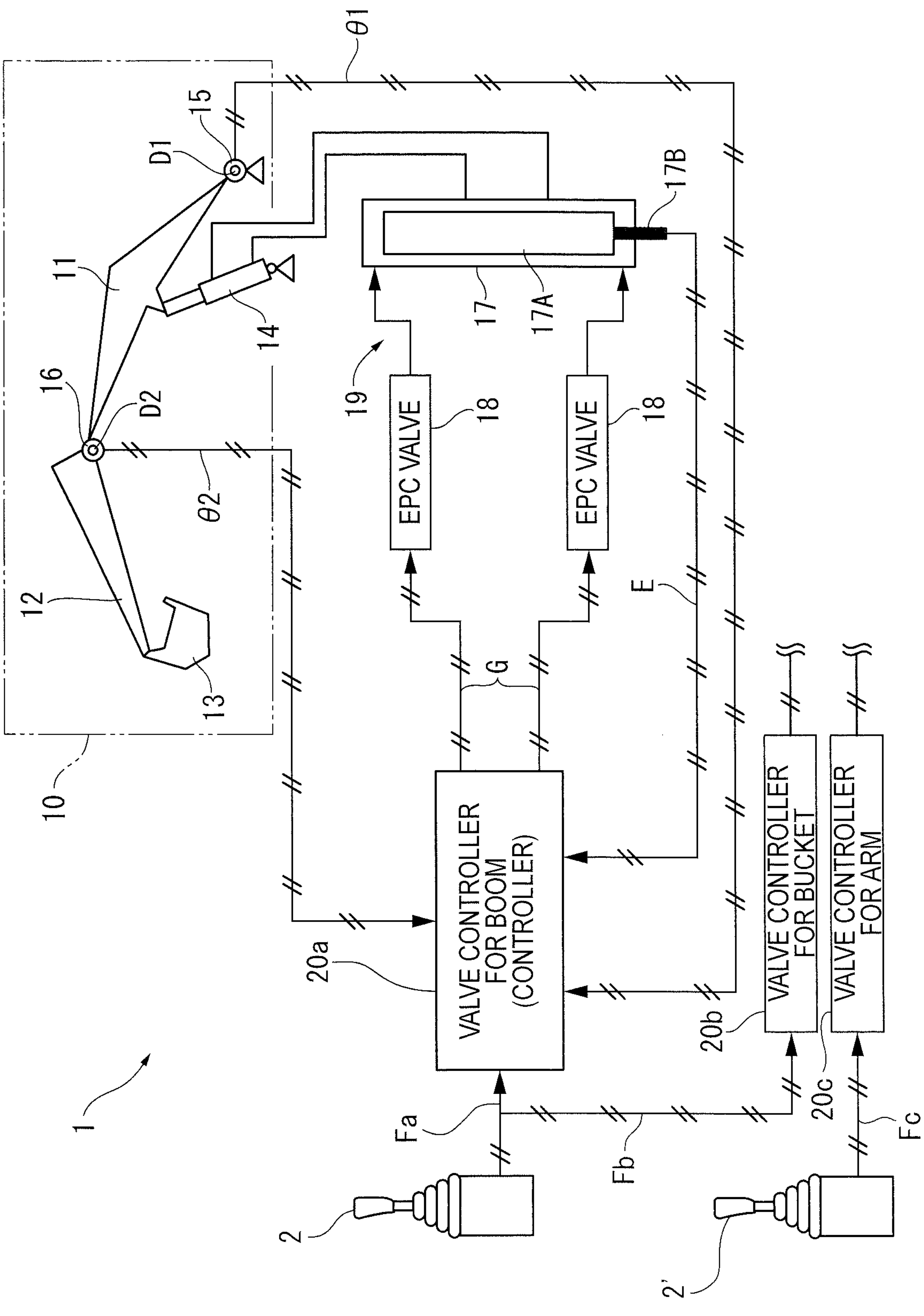
FIG. 1 is a schematic diagram showing a construction machine equipped with a working equipment according to an exemplary embodiment of the invention and a controller for the working equipment.
Figure 2:
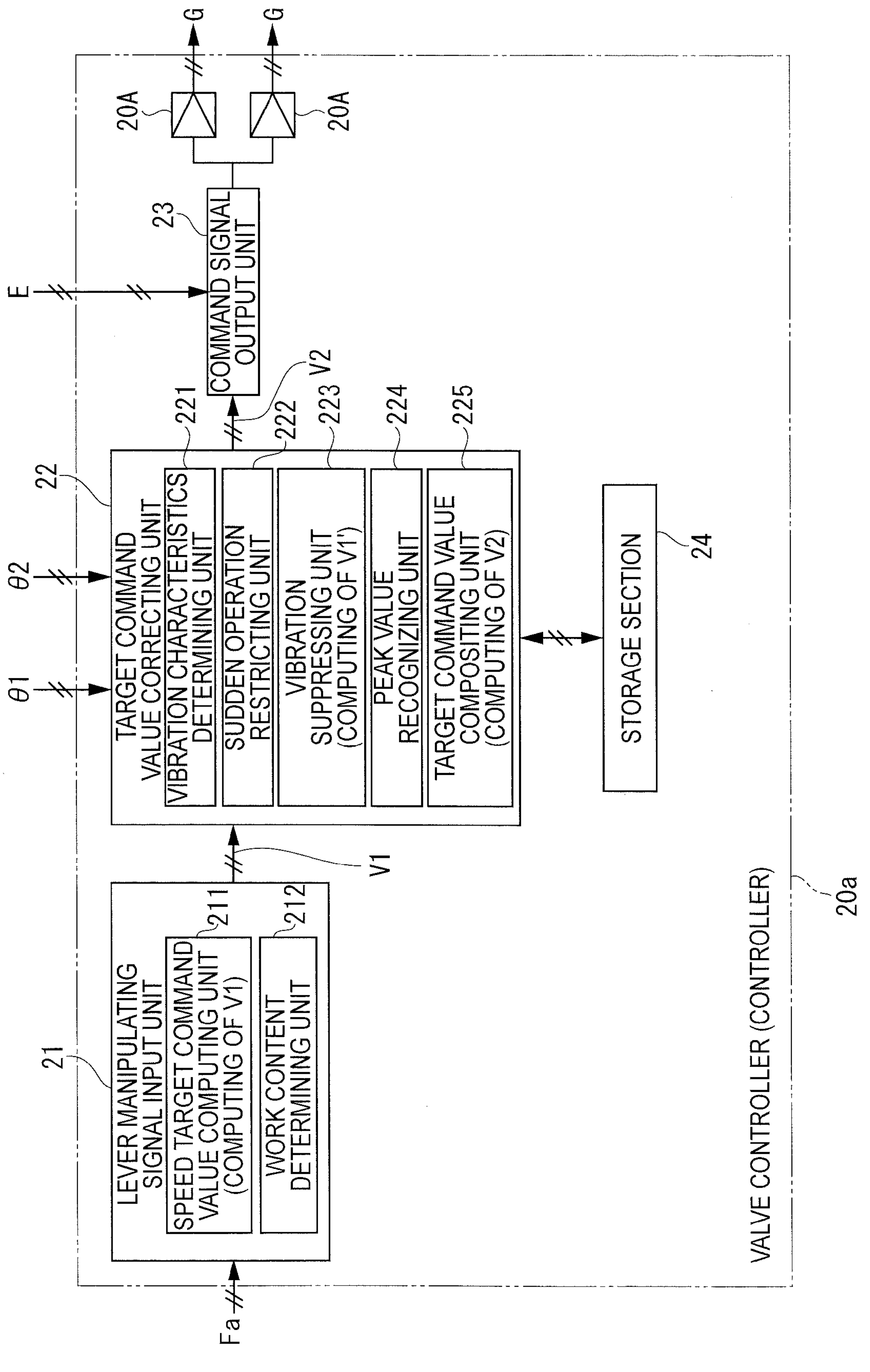
FIG. 2 is a block diagram showing the controller.

FIG. 1 is a schematic diagram showing a hydraulic excavator (construction machine) 1 equipped with a working equipment according to the exemplary embodiment of the invention and a controller for the working equipment. FIG. 2 is a block diagram showing the controller.

Referring to FIG. 1, the hydraulic excavator 1 includes a boom 11 that is operated by using a working equipment lever (operating unit) 2 and an arm 12 that is operated by using a working equipment lever (operating unit) 2'. A bucket 13 is attached to an end of the arm 12.

The boom 11 is rotated around a support point D1 by a hydraulic cylinder 14.

The arm 12 is rotated around a support point D2 by a hydraulic cylinder on the boom 11.

The bucket 13 is rotated by a hydraulic cylinder on the arm 12 when the working equipment lever 2 is manipulated in different directions. The boom 11, the arm 12 and the bucket 13 in combination provide a working equipment 10 according to the invention.

In this exemplary embodiment, since the invention is explained in detail with reference to, in particular, the boom 11, the hydraulic cylinders for the arm 12 and the bucket 13 are not shown.

In place of the bucket 13, any attachment such as a grapple and a hand may be used.

Angle sensors 15 and 16 such as rotary encoders or potentiometers are respectively provided at the support point D1 of the boom 11 and the support point D2 of the arm 12. The angle sensor 15 detects a joint angle θ1 of the boom 11 relative to a vehicle body (not shown). The angle sensor 16 detects a joint angle θ2 of the arm 12 relative to the boom 11. The joint angles θ1 and θ2 are outputted as an angle signal to a valve controller (controller) 20*a*.

The hydraulic cylinder 14 is hydraulically driven by a hydraulic oil fed from a main valve 17. A spool 17A of the main valve 17 is moved by a pair of EPC valves 18, 18 (proportional solenoid valves) to adjust a feed flow rate of the hydraulic oil to the hydraulic cylinder 14.

The hydraulic cylinder 14, the main valve 17 and the EPC valves 18 in combination provide a driving device 19 according to the invention.

The main valve 17 is provided with a position sensor 17B that detects a position E of the spool 17A. The position of the spool is outputted as a position signal E from the position sensor 17B to the valve controller 20*a*.

The working equipment lever 2 includes an inclination angle sensor such as a potentiometer, a PPC pressure sensor or a torque sensor with use of an electrostatic capacity or a laser. A lever manipulating signal Fa having a one-to-one relationship with the inclination angle of the working equipment lever 2 is outputted from the inclination angle sensor to the valve controller 20*a*.

When the working equipment lever 2 is at a neutral position, the outputted lever manipulating signal Fa is "0 (zero)", indicating that a speed of the boom 11 is "0 (zero)". When the working equipment lever 2 is inclined forward, the boom 11 is moved downward at a speed corresponding to the inclination angle of the working equipment lever 2. When the working equipment lever 2 is inclined backward, the boom 11 is moved upward at a speed corresponding to the inclination angle of the working equipment lever 2. The controls as described above are provided by the valve controller 20*a* described hereinafter.

The valve controller 20*a* has a function to move the boom 11 according to the lever manipulating signal Fa from the working equipment lever 2 and also to suppress vibrations when the boom 11 is started or stopped. The valve controller 20*a* is provided by a microcomputer or the like, and is typically incorporated as a portion of a governor pump controller mounted for controlling an engine of the hydraulic excavator 1 and for controlling a hydraulic pump thereof. However, in this exemplary embodiment, the valve controller 20*a* is shown as an independent component for convenience of description.

Also, a valve controller 20*b* for the bucket 13 to which a manipulating signal Fb is inputted and a valve controller 20*c* for the arm 12 to which a manipulating signal Fc is inputted have substantially the same functions and configurations respectively, but herein description is made with reference to the valve controller 20*a* for the boom 11 as a representative, and detailed descriptions of the valve controllers 20*b* and 20*c* are omitted herefrom.

(2) Structure of Valve Controller 20*a*

Specifically, as shown in FIG. 2, the valve controller 20*a* includes a lever manipulating signal input unit 21 to which the lever manipulating signal Fa from the working equipment lever 2 is inputted, a target command value correcting unit 22 to which a speed target command value V1 for normal motion from the lever manipulating signal input unit 21 is inputted, a command signal output unit 23 to which a corrected speed target command value V2 from the target command value correcting unit 22 is inputted, and a storage section 24 including a RAM, a ROM, or the like.

(2-1) Structure of Lever Manipulating Signal Input Unit 21

The lever manipulating signal input unit 21 includes a speed target command value computing unit 211 and a work content determining unit 212, each of which is provided by a computer program (software).

Figure 3A:
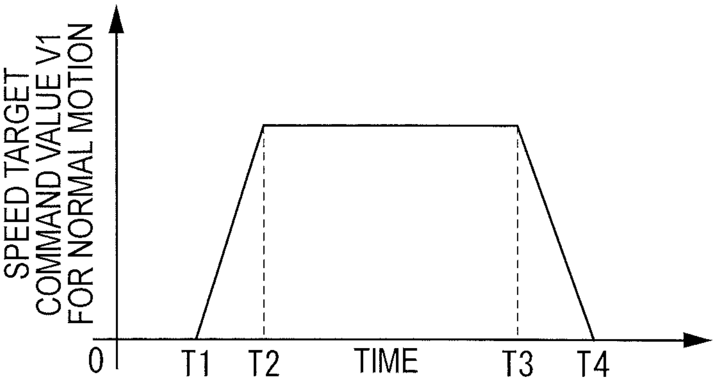
FIG. 3A is an illustration for explaining a speed target command value for normal motion.
Figure 3B:
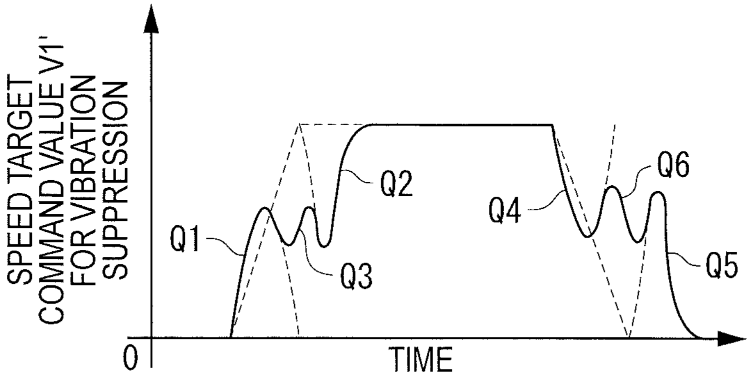
FIG. 3B is an illustration for explaining a speed target command value for vibration suppression.

FIG. 3A is an illustration for explaining the speed target command value V1 for normal motion. FIG. 3B is an illustration for explaining a speed target command value V1' for vibration suppression.

Based on the lever manipulating signal Fa from the working equipment lever 2, the speed target command value computing unit 211 (target command value computing unit) computes the speed target command value V1 for normal motion of the boom 11. For instance, when the working equipment lever 2 is inclined forward and maintained in the inclined state for a predetermined period of time and then is returned to the neutral position, the speed target command value V1 for normal motion provides a trapezoidal signal waveform as time elapses as shown in FIG. 3A.

Specifically, referring to FIG. 3A, at time T1, the working equipment lever 2 is at the neutral position and the boom 11 is stopped. When the working equipment lever 2 is inclined forward from the neutral position, the boom 11 is moved downward from a high position while being accelerated until T2 elapses. Subsequently, when the working equipment lever 2 is maintained in the inclined state, the boom 11 is moved downward at a constant pace for a period from T2 to T3. Subsequently, when the working equipment lever 2 is returned to the neutral position, the boom 11 is moved downward while being decelerated for a period from T3 to T4 and then stopped.

The work content determining unit 212 recognizes a work at a constant speed and a rolling compaction work among works performed with the boom 11, and has a function to operate the boom 11 based on the speed target command value V1 for normal motion without a process by the target command value correcting unit 22 during the works specified above.

(2-2) Structure of Target Command Value Correcting Unit 22

The target command value correcting unit 22, which is the most characteristic element in this exemplary embodiment, includes a vibration characteristics determining unit 221, a sudden operation restricting unit 222, a vibration suppressing unit 223, a peak value recognizing unit 224 and a target command value compositing unit 225, each of which is also provided by a computer program (software).

The vibration characteristics determining unit 221 has a function to determine a frequency ω and a damping coefficient ζ corresponding to postures of the boom 11 and arm 12 in response to input of the joint angles θ1 and θ2. The joint angles θ1 and θ2 vary within a predetermined range in conjunction with changes in postures of the boom 11 and arm 12, but the frequency ω and the damping coefficient ζ of the boom 11 corresponding to the joint angles θ1 and θ2 are previously measured and calculated for an actual vehicle and are stored in the storage section 24.

Accordingly, when the joint angles θ1 and θ2 are inputted, the frequency ω and the damping coefficient ζ corresponding to the joint angles θ1 and θ2 are immediately retrieved from the storage section 24, and are used by the vibration suppressing unit 223 in the following process.

The sudden operation restricting unit 222 has a function to perform a process for the case where the boom 11 is suddenly started or stopped as a result of sudden manipulation of the working equipment lever 2.

The vibration suppressing unit 223 has a function to correct the speed target command value V1 for normal motion obtained from the lever manipulating signal Fa to the speed target command value V1' for vibration suppression, which results in suppression of vibrations in the boom 11. Referring to FIGS. 3A and 3B for describing the above process, the signal waveform of the speed target command value V1 for normal motion shown in FIG. 3A is corrected to the signal waveform of the speed target command value V1' for vibration suppression shown in FIG. 3B.

Determination of specific vibration characteristics and computing for the correction to the speed target command value V1' are performed based on a logic described below.

(a) Principle for Computing of Speed Target Command Value V1'

Characteristics shown after the EPC valves 18 up to the motion of the working equipment 10 complicatedly vary depending on the posture of the working equipment 10 and a load (payload) on the working equipment 10, but are determined irrespective of computing performed by the valve controller 20*a* at the previous stage.

In view of the above, in this exemplary embodiment, in order to eliminate a main component of vibrations in the working equipment 10 with a simple computing, the characteristics shown after the EPC valves 18 up to the motion of working equipment 10 are approximated based on secondary delay characteristics represented by a formula (1). Although the vibration characteristics of the working equipment 10 including the boom 11 are obtained in the following description, the invention is not limited thereto and thus the vibration characteristics of the vehicle body (not shown) are approximated as well.

In this formula, V1' represents a speed target command value inputted to the EPC valves 18, Y represents an output from the working equipment 10, S represents a Laplace operator, and ω and ζ each represent a parameter variable depending on the posture and the payload.

Formula 1

$$\frac{Y}{V1'} = \frac{\omega^2}{S^2 + 2\zeta\omega S + \omega^2} \tag{1}$$

In order to offset residual vibrations due to the characteristics shown after the EPC valves 18 up to the motion of the working equipment 10, a computing unit is inserted after input by the working equipment lever 2 before input to the EPC valves 18 so that a section before the EPC valves 18 is provided with characteristics that, for instance, include the reciprocal of the formula (1). In this exemplary embodiment, for instance, characteristics represented by a formula (2) below are employed.

In this formula, V1 represents a target command value from the working equipment lever 2, V1' is a speed target command value inputted to the EPC valves 18, S is a Laplace operator, ω and ζ each represent the parameter used in the formula (1), and $\omega_0$ is a constant that is separately determined.

Formula 2

$$\frac{V1'}{V1} = \frac{S^2 + 2\zeta\omega S + \omega^2}{\omega^2}\left(\frac{\omega_0}{S + \omega_0}\right)^2 \tag{2}$$

As described above, with the arrangement in which characteristics shown after the EPC valves 18 are offset by characteristics shown before the EPC valves 18, the entire characteristics shown after input by the working equipment lever 2 until the motion of the working equipment 10 become the product of the formula (1) and the formula (2), so that it is possible to eliminate vibrations in the working equipment 10 as shown in a formula (3) below.

In this formula, V1 is a target command value from the working equipment lever 2, V1' is a speed target command value inputted to the EPC valves 18, Y is an output from the working equipment 10, S is a Laplace operator, and $\omega_0$ is a constant that is separately determined.

Formula 3

$$\frac{Y}{V1} = \frac{V1'}{V1} \times \frac{Y}{V1'} = \left(\frac{\omega_0}{S + \omega_0}\right)^2 \tag{3}$$

(b) Method for Realizing Computing of Inverse Characteristics

Based on the above principle, the vibration suppressing unit 223 computes a speed target command value that provides inverse characteristics based on formulae (4) to (7) below.

In these formulae, V1 is a speed target command value from the working equipment lever 2 and V1' is a speed target command value for vibration suppression. The parameters ω and ζ of the working equipment 10 are known, $\omega_o$ is a constant appropriately determined, and Δt is a time interval for computing by the valve controller 20*a*.

Formula 4

$$V1' = C0 \times V1 + C1 \times F1 + C2 \times F2 \tag{4}$$

-continued

Formula 5

$$C0 = \frac{\omega_0^2}{\omega^2}\ C1 = \frac{2\omega_0(\zeta\omega - \omega_0)}{\omega^2}\ C2 = \frac{\omega^2 + \omega_0^2 - 2\zeta\omega\omega_0}{\omega^2} \tag{5}$$

Formula 6

$$F1 = V1 - \frac{V1 - \overset{\text{PREVIOUS}}{F1}}{1 + \omega_0 \times \Delta t} \tag{6}$$

Formula 7

$$F2 = F1 - \frac{F1 - \overset{\text{PREVIOUS}}{F2}}{1 + \omega_0 \times \Delta t} \tag{7}$$

As shown above, coefficients C0 to C2 calculated by the formula (5) and F1 and F2 calculated by the formulae (6) and (7) are substituted in the formula (4) to obtain the input V1' to the EPC valves 18. F1 is a value obtained by filtering V1 and F2 is a value obtained by filtering F1.

By obtaining the input V1' to the EPC valves 18, the vibration suppressing unit 223 can correct the speed target command value V1 for normal motion obtained from the lever manipulating signal Fa from the working equipment lever 2 to the speed target command value V1' for vibration suppression to prevent vibrations in the boom 11.

With the above computing for correction, referring to FIGS. 3A and 3B, when the working equipment lever 2 is inclined forward from the state in which the working equipment lever 2 is at the neutral position and the boom 11 is stopped, so that the boom 11 is moved downward while being accelerated, the vibration characteristics determining unit 221 is triggered by the movement of the working equipment lever 2 away from the neutral position (T1) to calculate the frequency ω and the damping coefficient ζ corresponding to the posture of the working equipment 10 per unit of time Δt. Using the calculated frequency ω and damping coefficient ζ, the vibration suppressing unit 223 calculates C0 to C2, F1 and F2 per unit of time Δt based on the formulae (5), (6) and (7), and calculates the speed target command value V1' for vibration suppression corrected per unit of time Δt based on the formula (4).

In this manner, the speed target command value V1 for normal motion is corrected to the speed target command value V1' for vibration suppression provided by, for instance, curves Q1, Q2 and Q3 shown in FIG. 3B. In the portion corresponding to the curve Q1, which is formed by being triggered with time T1, the speed target command value V1' for vibration suppression is corrected so that the curve formed by the speed target command value V1' for vibration suppression bulges in such a direction that the speed target command value V1' for vibration suppression becomes larger than the speed target command value V1 for normal motion. In the portion corresponding to the curve Q3, which is the portion after the peak of the curve Q1 to the point corresponding to time T2, the speed target command value V1' for vibration suppression is corrected to follow an increase in the speed target command value V1 for normal motion as a whole while being smaller than the speed target command value V1 for normal motion. In the portion corresponding to the curve Q2, which is formed by being triggered with time T2 when the speed target command value V1 for normal motion reaches a maximum value, the speed target command value V1' for vibration suppression is corrected so that the curve formed by the speed target command value V1' for vibration suppression bulges in such a direction that the speed target command value V1' for vibration suppression becomes smaller than the speed target command value V1 for normal motion, and reaches the maximum value at a timing later than time T2 when the speed target command value V1 for normal motion reaches the maximum value.

In this exemplary embodiment, the separate description is made on each of the curves Q1 to Q3 for convenience. These curves, however, are intended to be sequentially calculated by the formulae (5), (6), (7) and (4), so that switching the formulae is not necessary.

On the other hand, in returning the working equipment lever 2 to the neutral position to stop the downward movement of the boom 11, the same computing is performed, the computing being triggered with the movement of the working equipment lever 2 toward the neutral position (T3). For instance, the speed target command value V1 for normal motion is corrected to the speed target command value V1' for vibration suppression provided by curves Q4, Q5 and Q6. In the portion corresponding to the curve Q4, which is formed by being triggered with time T3, the speed target command value V1' for vibration suppression is corrected so that the curve formed by the speed target command value V1' for vibration suppression bulges in such a direction that the speed target command value V1' for vibration suppression becomes smaller than the speed target command value V1 for normal motion. In the portion corresponding to the curve Q6, which is the portion after the peak of the curve Q4 to the point corresponding to time T4, the speed target command value V1' for vibration suppression is corrected to be larger than the speed target command value V1 for normal motion so as to "chase" the decrease in the speed target command value V1 for normal motion to follow a decrease in the speed target command value V1 for normal motion as a whole while being larger than the speed target command value V1 for normal motion. In the portion corresponding to the curve Q6, which is formed by being triggered with time T4 when the speed target command value V1 for normal motion reaches 0 (zero), the speed target command value V1' for vibration suppression is corrected so that the curve formed by the speed target command value V1' for vibration suppression bulges in such a direction that the speed target command value V1' for vibration suppression becomes larger than the speed target command value V1 for normal motion, and the working equipment 10 is stopped at a timing later than time T4 when the speed target command value V1 for normal motion reaches 0 (zero).

At this time, the boom 11 starts its movement in accordance with the movement of the driving device 19. A section from the driving device 19 to the boom 11 suffers from vibrations due to the compressibility of a hydraulic fluid, the elasticity of a pipe, and the like, but the vibration component is offset when the boom 11 is moved based on the speed target command value V1' for vibration suppression. Thus, the boom 11 is moved without vibrations as desired by an operator.

The description of this exemplary embodiment assumes a case where the speed target command value V1 for normal motion has a trapezoidal signal waveform. However, even when the signal waveform of the speed target command value V1 for normal motion shows a substantially convex shape (i.e., for instance, when inclination of the working equipment lever 2 away from the neutral position is temporarily stopped and then the inclination thereof is restarted during a period from time T1 to time T2, or when inclination of the working equipment lever 2 toward the neutral position is temporarily stopped and then the inclination is restarted during a period from time T3 to time T4), correction of the speed target command value V1 for normal motion is made in the same way when the inclination of the working equipment lever 2 is temporarily stopped or restarted. The same applies to a case where a signal waveform of the speed target command value V1 for normal motion shows a step-like shape.

Figure 4:
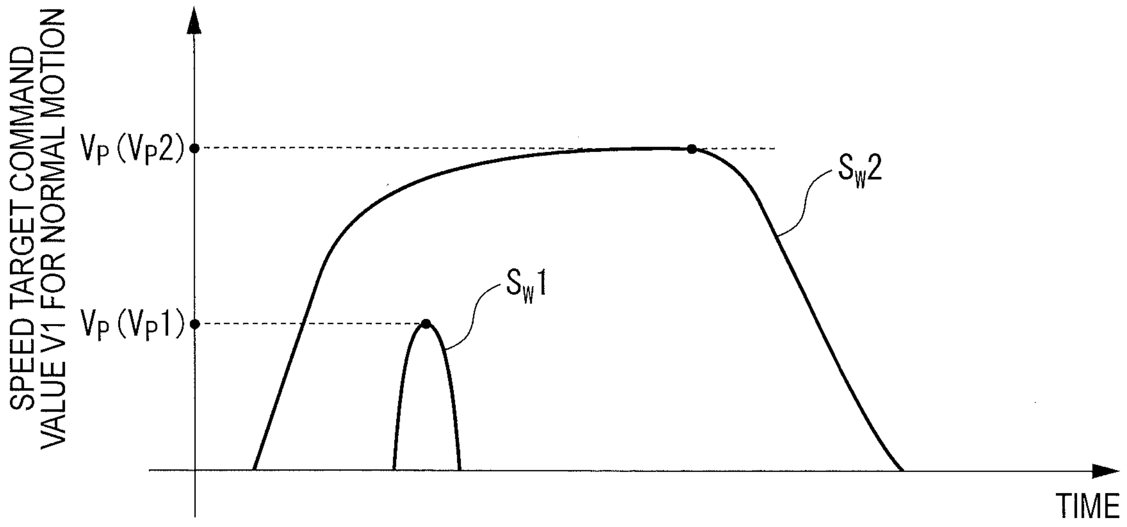
FIG. 4 is an illustration for explaining a peak value of the speed target command value for normal motion.

FIG. 4 is an illustration for explaining a peak value of the speed target command value V1 for normal motion.

In FIG. 4, a signal waveform $S_w$1 is a signal waveform of the speed target command value V1 for normal motion resulting from a so-called inching operation in which the working equipment lever 2 is inclined from the neutral position and then returned to the neutral position in a short time for fine positioning of the working equipment 10. Further, in FIG. 4, a substantially trapezoidal signal waveform $S_w$2 is a signal waveform of the speed target command value V1 for normal motion resulting from any other lever operation than the inching operation, in particular, a signal waveform of the speed target command value V1 for normal motion resulting from an operation in which the working equipment lever 2 is more inclined from the neutral position than in the above inching operation and then returned to the neutral position.

The peak value recognizing unit 224 receives a sequential input of the speed target command value V1 for normal motion obtained from the lever manipulating signal Fa and recognizes the peak value of the speed target command value V1 for normal motion.

For instance, when the signal waveform of the inputted speed target command value V1 for normal motion is the signal waveform $S_w$1 resulting from the inching operation, as shown in FIG. 4, the peak value recognizing unit 224 recognizes a speed target command value $V_p$($V_p$1) at which the speed target command value V1 for normal motion turns downward (deceleration) as the peak value.

On the other hand, for instance, when the signal waveform of the inputted speed target command value V1 for normal motion is the substantially trapezoidal signal waveform $S_w$2, the peak value recognizing unit 224 likewise recognizes a speed target command value $V_p$($V_p$2) at which the speed target command value V1 for normal motion turns downward (deceleration) as the peak value.

The target command value compositing unit 225 has a function to composite the speed target command value V1 for normal motion and the speed target command value V1' for vibration suppression based on the peak value $V_p$ for correction to the speed target command value V2 corresponding to the lever operation.

Specifically, the target command value compositing unit 225 calculates β that provides respective composition ratios of the speed target command value V1 for normal motion and the speed target command value V1' for vibration suppression by a formula (8) below. Based on the calculated β, the target command value compositing unit 225 calculates the speed target command value V2 by a formula (9) below.

In the formula, Vmax represents the speed target command value V1 based on the lever manipulating signal Fa provided when the working equipment lever 2 is inclined from the neutral position at the maximum inclination angle within the structurally possible range.

Formula 8

$$\beta = \frac{V_p}{V\max} \tag{8}$$

-continued

Formula 9

$$V2 = (1-\beta)\cdot V1 + \beta\cdot V1' \tag{9}$$

The formulae (8) and (9) are construed as follows.

As shown in the formula (8), as the inclination angle of the working equipment lever 2 at the time for the speed target command value V1 for normal motion to turn downward (deceleration) is closer to the maximum inclination angle, in other words, as the peak value $V_p$ is closer to Vmax, β is closer to 1. In contrast, as the inclination angle of the working equipment lever 2 at the time for the speed target command value V1 for normal motion to turn downward (deceleration) is closer to 0 (neutral position), in other words, as the peak value $V_p$ is closer to 0, β is closer to 0.

Thus, when the ongoing lever operation of the working equipment lever 2 is the inching operation or the like and the inclination angle of the working equipment lever 2 at the time for the speed target command value V1 for normal motion to turn downward (deceleration) is close to 0 (neutral position), in other words, when the peak value recognizing unit 224 recognizes a relatively small value, i.e., the speed target command value $V_p$ 1 (FIG. 4), a value of β calculated by the formula (8) is relatively small (close to 0).

In contrast, when the inclination angle of the working equipment lever 2 at the time for the speed target command value V1 for normal motion to turn downward (deceleration) is close to the maximum inclination angle, in other words, when the peak value recognizing unit 224 recognizes a relatively large value, i.e., the speed target command value $V_p$2 (FIG. 4), a value of β calculated by the formula (8) is relatively large (close to 1).

As shown in the formula (9), for compositing the speed target command value V1 for normal motion and the speed target command value V1' for vibration suppression, the composition ratio of the speed target command value V1 for normal motion is (1−β) and the composition ratio of the speed target command value V1' for vibration suppression is β.

Thus, in the inching operation or the like, in which the inclination angle of the working equipment lever 2 at the time for the speed target command value V1 for normal motion to turn downward (deceleration) is close to 0 (neutral position), the speed target command values V1 and V1' are composited based on the composition ratio (β) of the speed target command value V1' for vibration suppression and the composition ratio (1−β) of the speed target command value V1 for normal motion to calculate the speed target command value V2, the composition ratio (β) being low, the composition ratio (1−β) being contrarily high. In the above case, in other words, the speed target command value V2 is calculated while the vibration suppression function of the vibration suppressing unit 223 is weakened.

In contrast, when the inclination angle of the working equipment lever 2 at the time for the speed target command value V1 for normal motion to turn downward (deceleration) is close to the maximum inclination angle, the speed target command values V1 and V1' are composited based on the composition ratio (β) of the speed target command value V1' for vibration suppression and the composition ratio (1−β) of the speed target command value V1 for normal motion to calculate the speed target command value V2, the composition ratio (β) being high, the composition ratio (1−β) being contrarily low. In the above case, in other words, the speed target command value V2 is calculated while the vibration suppression function of the vibrating suppressing unit 223 is enhanced.

In other words, the target command value compositing unit 225 enhances or weakens the vibration suppression function of the vibration suppressing unit 223 in accordance with the state of the lever operation to calculate the speed target command value V2.

(2-4) Structure of Command Signal Output Unit 23

The command signal output unit 23 has a function to generate a command signal (current signal) G to the driving device 19 based on the corrected speed target command value V2 and output the command signal G to the EPC valves 18 via amplifiers 20A, 20A. The EPC valves 18 move the spool 17A of the main valve 17 based on this command signal G, and adjusts a feed rate of the hydraulic fluid to the hydraulic cylinder 14.

(3) Structure of Valve Controller **20*a***

Figure 5:
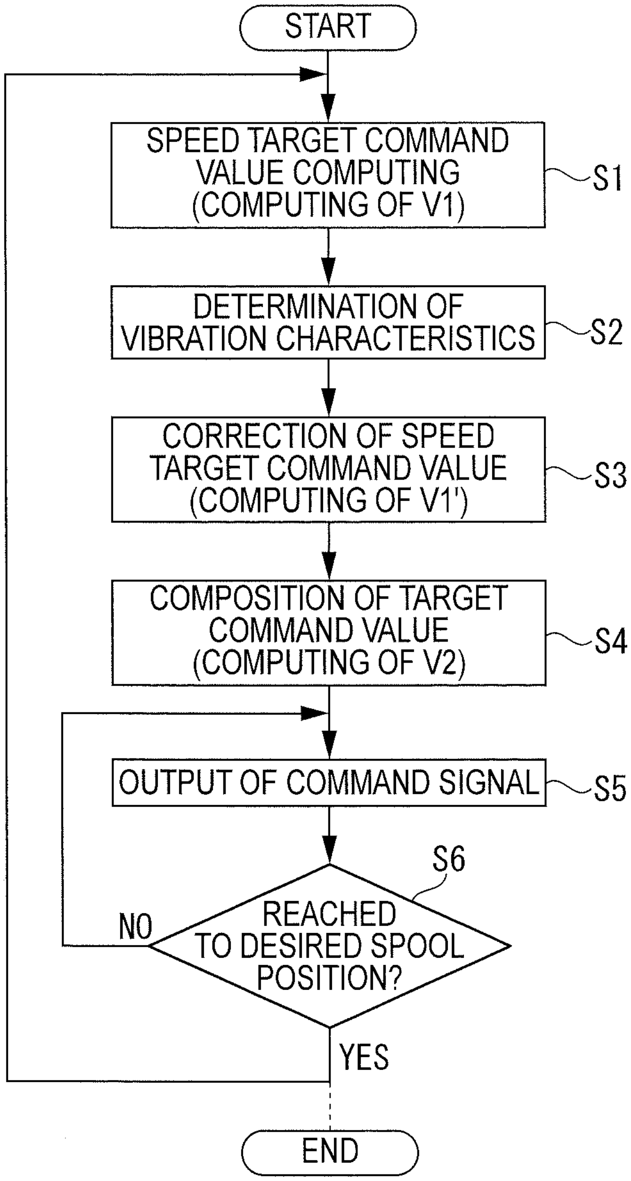
FIG. 5 is a flow chart for explaining a method for controlling the working equipment.

Next, a method for controlling the boom 11 is described also with reference to the flow chart in FIG. 5.

(a) Step S1: At first, when an operator starts manipulation of the working equipment lever 2, the speed target command value computing unit 211 in the lever manipulating signal input unit 21 computes the speed target command value V1 for normal motion based on the lever manipulating signal Fa from the working equipment lever 2.

(b) Step S2: The vibration characteristics determining unit 221 in the target command value correcting unit 22 determines the frequency ω and the damping ratio ζ corresponding to the joint angles θ1 and θ2. The vibration characteristics determining unit 221 stores the determined frequency ω and damping ratio ζ in a storage such as a RAM provided to the valve controller 20*a*.

(c) Step S3: In this step, the vibration suppressing unit 223 computes the speed target command value V1' for vibration suppression from the speed target command value V1 for normal motion.

For this computing, the frequency ω and damping ratio ζ obtained and stored in the storage such as a RAM in step S2 are used to calculate the speed target command value V1' for vibration suppression by the above formulae (5), (6), (7) and (4).

(d) Step S4; In this step, the target command value compositing unit 225 composites the speed target command value V1 for normal motion and the speed target command value V1' for vibration suppression to compute the speed target command value V2 corresponding to the lever operation.

Figure 6:
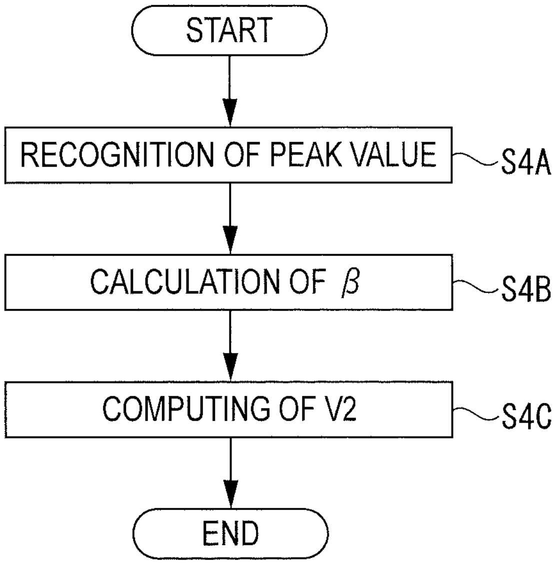
FIG. 6 is a flow chart for explaining a target command compositing process.

Specifically, the process proceeds in accordance with the flow chart shown in FIG. 6.

Although steps S4A and S4B (described later) are intended to be performed in parallel with the above step S3, steps S4A and S4B are described as steps performed after step S3 for convenience of description.

Step S4A: At first, the peak value recognizing unit 224 receives a sequential input of the speed target command value V1 for normal motion based on the lever manipulating signal Fa, and recognizes the peak value $V_p$ of the speed target command value V1 for normal motion.

Step S4B: Subsequently, using the recognized peak value $V_p$, the target command value compositing unit 225 calculates β by the above formula (8).

Step S4C: Further, using the calculated β, the target command value compositing unit 225 composites the speed target command value V1 for normal motion and the speed target command value V1' for vibration suppression to calculate the speed target command value V2 by the above formula (9).

(h) Step S5: Then, the command signal output unit 23 is actuated. The command signal output unit 23 converts the corrected speed target command value V2 into the command signal G and outputs the command signal G to the EPC valves 18.

(i) Step 8: When the spool 17A of the main valve 17 is moved due to a pilot pressure from the EPC valves 18, the command signal output unit 23 monitors a position of the spool 17A based on the position signal E fed back from the position sensor 17B, and outputs the command signal G so that the spool 17A maintains a precise position.

In the above manner, the boom 11 is driven by a hydraulic pressure from the main valve 17.

(4) Advantages of Exemplary Embodiment

According to the exemplary embodiment described above, the following advantages are provided.

FIGS. 7A to 8C are illustrations for explaining the advantages of the exemplary embodiment.

In FIGS. 7A to 8C, horizontal axes represent time elapsed and vertical axes represent the lever manipulating signal Fa, the speed target command value V1 and an actual motion speed of the hydraulic cylinder 14 (a cylinder speed), respectively.

Figure 7A:
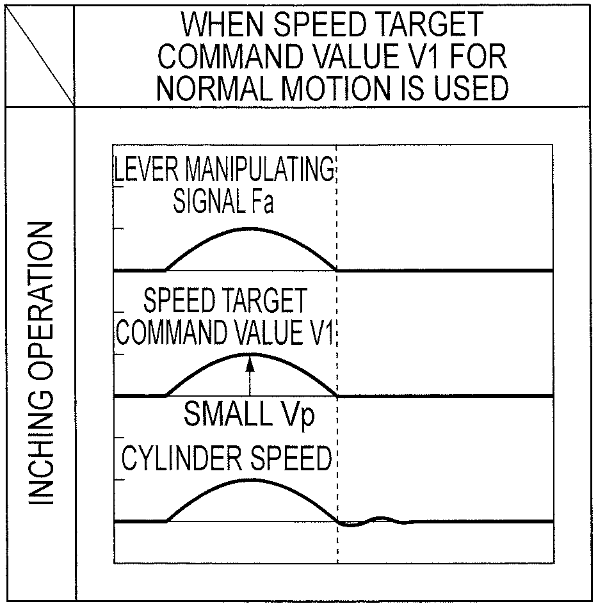
FIG. 7A is an illustration for explaining advantages of the exemplary embodiment.
Figure 7B:
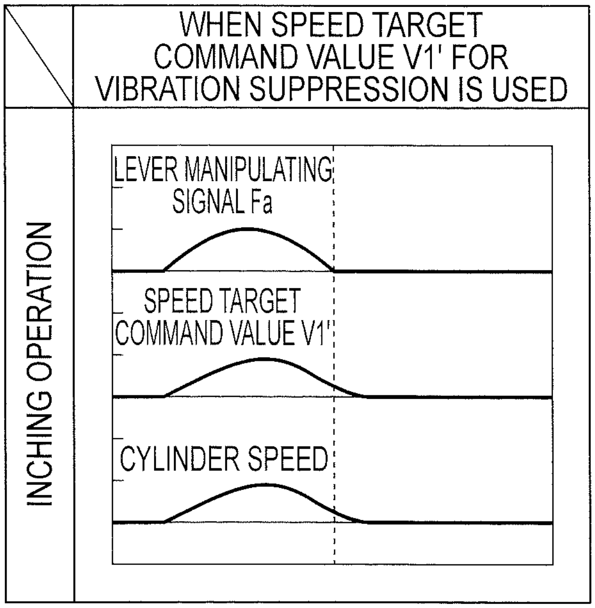
FIG. 7B is an illustration for explaining advantages of the exemplary embodiment.

During the inching operation or the like, when the peak value $V_p$ at the time for the speed target command value V1 for normal motion to turn downward (deceleration) is small (close to 0), the cylinder speed is also small as shown in FIG. 7A, so that vibrations are unlikely to occur. Applying the speed target command value V1' for vibration suppression to such an operation causes a time lag between a time when the working equipment lever 2 is returned to the neutral position (when the lever manipulating signal Fa is returned to 0) and a time when the cylinder speed becomes 0 as shown in FIG. 7B, which hampers fine positioning of the boom 11 as an unintended motion.

Figure 7C:
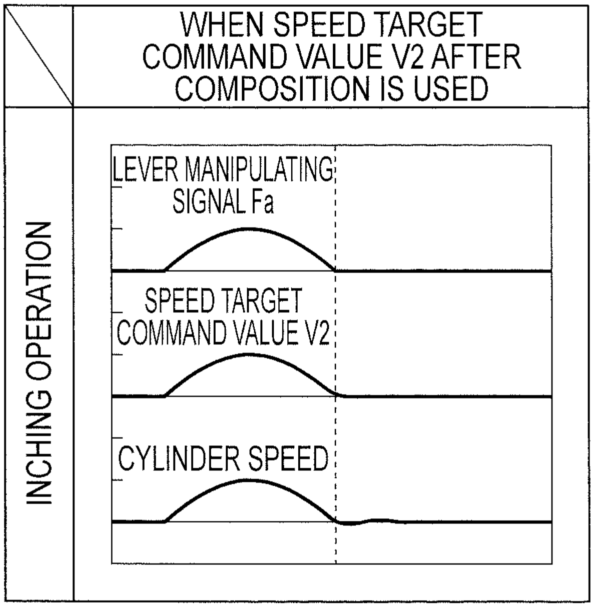
FIG. 7C is an illustration for explaining advantages of the exemplary embodiment.

In such a case, the variation of the speed target command value V2 is brought close to the speed target command value V1 for normal motion, the speed target command value V2 being provided by composition based on the small composition ratio β resulting from the small peak value $V_p$ of the speed target command value V1 for normal motion. In this manner, as shown in FIG. 7C, the cylinder speed becomes approximately 0 when the working equipment lever 2 is returned to the neutral position, so that an unintended motion of the boom 11 can be suppressed.

Figure 8A:
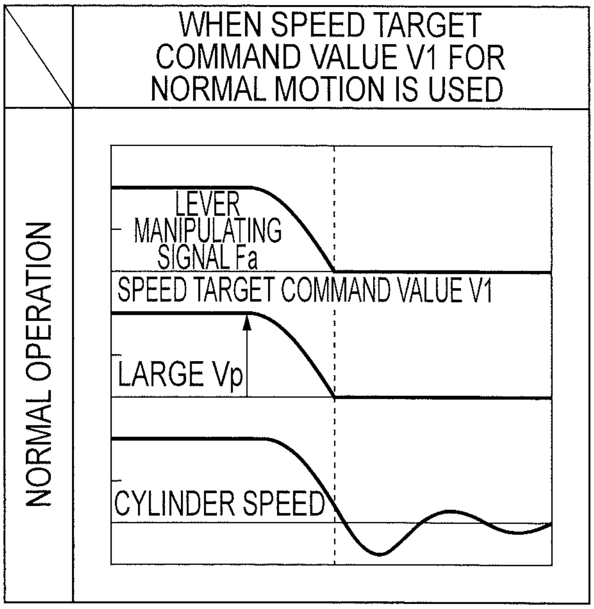
FIG. 8A is an illustration for explaining advantages of the exemplary embodiment.
Figure 8B:
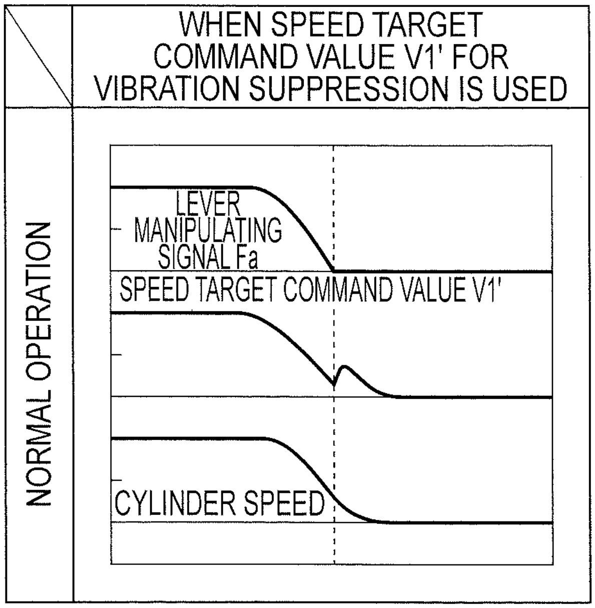
FIG. 8B is an illustration for explaining advantages of the exemplary embodiment.

In contrast, during a lever operation other than above, when the peak value $V_p$ is large (close to the maximum speed) at the time for the speed target command value V1 for normal motion to turn downward (deceleration), the cylinder speed is large as shown in FIG. 8A, so that large vibrations occur immediately after stoppage. By applying the speed target command value V1' for vibration suppression to such an operation, vibrations can be suppressed as shown in FIG. 8B. An unintended motion is caused at this time but it does not matter because an operation to suddenly stop the working equipment during a high-speed motion thereof does not require fine positioning.

Figure 8C:
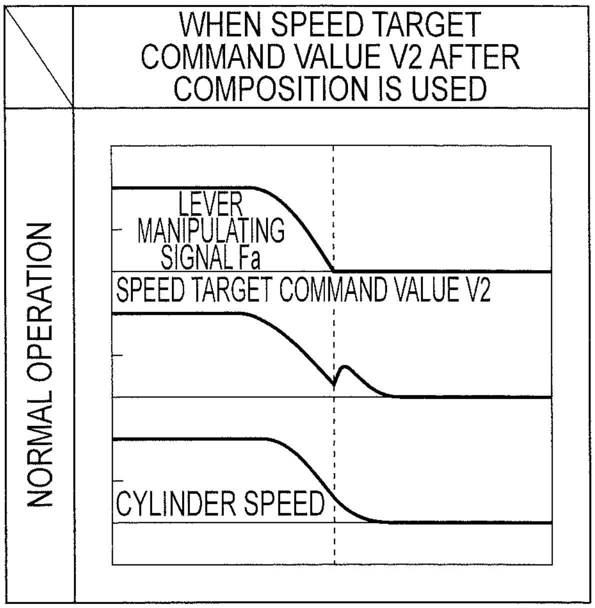
FIG. 8C is an illustration for explaining advantages of the exemplary embodiment.

In such a case, the variation of the speed target command value V2 is brought close to the speed target command value V1' for vibration suppression, the speed target command value V2 being provided by composition based on the large composition ratio β resulting from the large peak value $V_p$ of the speed target command value V1 for normal motion. In this manner, as shown in FIG. 8C, vibrations in the cylinder speed can be suppressed when the working equipment lever 2 is returned to the neutral position.

As described above, by enhancing or weakening the vibration suppression function in accordance with the operation state of the working equipment lever 2 (the magnitude of the peak value $V_p$), it is possible to improve the operability of the working equipment while suppressing vibrations in the working equipment 10.

Since the speed target command value V1 for normal motion and the speed target command value V1' for vibration suppression are composited based on a simple calculation such as the formulae (8) and (9), a processing load on the valve controller 20*a* can be reduced.

In addition, since the speed target command value computing unit 211 and the target command value correcting unit 22, which are the most characteristic elements in this exemplary embodiment, are provided by software, they can be incorporated in the valve controller 20*a* of the existing hydraulic excavator 1. Thus, without increasing costs, it is possible to improve the operability of the working equipment while suppressing vibrations in the working equipment 10.

The scope of the invention is not limited to the above-described exemplary embodiment, but includes other configurations and the following modifications as long as an object of the invention can be achieved.

Although the invention is applied to the hydraulic excavator 1 in the above exemplary embodiment, the invention may be applied to any other construction machine such as a wheel loader or a bulldozer.

Although the calculation of the formulae (8) and (9) is performed for compositing the speed target command value V1 for normal motion and the speed target command value V1' for vibration suppression in the above exemplary embodiment, the invention is not limited thereto. In other words, any other formula or formulae may be employed as long as an increase in the peak value $V_p$ results in a lowering in the composition ratio of the speed target command value V1 for normal motion and a rise in the composition ratio of the speed target command value V1' for vibration suppression and, in contrast, a decrease in the peak value $V_p$ results in a rise in the composition ratio of the speed target command value V1 for normal motion and a lowering in the composition ratio of the speed target command value V1' for vibration suppression.

Although the lever manipulating signal input unit 21 to which the lever manipulating signal Fa is inputted is provided in the body of the valve controller 20*a* for a structural reason in the above exemplary embodiment, the lever manipulating signal input unit 21 may be provided to the working equipment lever 2 for a structural reason while still serving as a part of the valve controller 20*a*. In such a case, the speed target command value V1 for normal motion outputted from the lever manipulating signal input unit 21 is directly inputted to the target command value correcting unit 22 in the body of the valve controller 20*a*.

Although the work posture of the boom 11 is judged from the joint angles θ1 and θ2 to determine the frequency ω and the damping ζ ratio based on the work posture in the above exemplary embodiment, such a work posture may be judged from the hydraulic pressure (load) of the hydraulic cylinder 14 to determine the frequency ω and the damping ratio ζ based on the hydraulic pressure.

Alternatively, each of the frequency ω and the damping ratio ζ may be set at a constant value irrespective of the work posture or the load, where a complete suppression of vibrations in the working equipment is not attained but a joint angle sensor and a pressure sensor are not required, so that a cost increase can be reduced.

Although the driving device 19 includes the hydraulic cylinder 14 and the main valve 17 for hydraulically driving the hydraulic cylinder 14 in the above exemplary embodiment, a driving device according to the invention may drive a working equipment with the assistance of an electric motor or a hydraulic motor.

In the above exemplary embodiment, as long as vibrations in the entire construction machine are suppressed in accordance with the vibration characteristics of only a vehicle body, the invention may be implemented irrespective of the vibration characteristics of the working equipment. In other words, an arrangement in which rolling or vibrations can be suppressed in accordance with the vibration characteristics of a construction machine (a working equipment and/or a vehicle body) is included in the scope of the invention.

For instance, when the invention is applied to a construction machine in which the centroid of a vehicle body is variable (e.g., a power shovel whose cab is vertically movable), a signal from a sensor that detects the height of the cab can be inputted to a determining unit for vibration characteristics. When a counterweight is attached or detached, the attachment or detachment may be detected by a payload sensor so that a detection signal is likewise inputted to a determining unit for vibration characteristics.

Although a linear secondary delay model is employed as the vibration model of the boom 11 in the above exemplary embodiment, any vibration model may be employed as long as vibrations in the boom 11 can be predicted.

Although the best arrangement, method, and the like for carrying out the invention have been described above, the scope of the invention is not limited thereto. In other words, although a particular embodiment of the invention is mainly illustrated and described, a variety of modifications may be made by those skilled in the art on shapes, amounts, and other detailed arrangements of the embodiment as described above without departing from the spirit and object of the invention.

Thus, a shape, quantity and the like described above merely serve as exemplifying the invention for facilitating an understanding of the invention, and do not serve as any limitations on the invention, so that what is described by a name of a component for which the description of the shape, quantity and the like are partially or totally omitted is also included in the invention.

The invention claimed is:

1. A construction machine comprising:

a working equipment;

an operating unit that is used to operate the working equipment; and a controller that controls the working equipment based on a manipulating signal inputted through the operating unit, the controller comprising:

a target command value computing unit that generates a speed target command value for normal motion of the working equipment based on the manipulating signal;

a target command value correcting unit that corrects the speed target command value for normal motion; and a command signal output unit that outputs a command signal to a driving device that drives the working equipment based on the corrected speed target command value, the target command value correcting unit comprising:

a vibration suppressing unit that generates a speed target command value for vibration suppression to suppress generation of vibrations in the working equipment based on the speed target command value for normal motion;

a peak value recognizing unit that recognizes a peak value of the speed target command value for normal motion based on the speed target command value for normal motion sequentially generated by the target command value computing unit; and a target command value compositing unit that composites the speed target command value for normal motion and the speed target command value for vibration suppression in accordance with the peak value to correct the speed target command value for normal motion.

2. A method for controlling a construction machine, the construction machine comprising: a working equipment; an operating unit that is used to operate the working equipment; and a controller that controls the working equipment based on a manipulating signal inputted through the operating unit, the method comprising:

generating a first target command value as a speed target command value for normal motion of the working equipment based on the manipulating signal inputted through the operating unit used to operate the working equipment;

generating a second target command value as a speed target command value for vibration suppression to suppress generation of vibrations in the working equipment based on the speed target command value for normal motion;

recognizing a peak value of the speed target command value for normal motion based on the speed target command value for normal motion sequentially generated in the generating of the first target command value; and compositing the speed target command value for normal motion and the speed target command value for vibration suppression in accordance with the peak value to correct the speed target command value for normal motion, the generating of the speed target command value for normal motion, the generating of the speed target command value for vibration suppression, the recognizing of the peak value and the compositing of the speed target command value for normal motion and the speed target command value for vibration suppression being carried out by the controller.

* * * * *